(No Model.) 2 Sheets—Sheet 1.
R. A. BOWEN & J. M. EATON.
HAY PRESS.
No. 391,680. Patented Oct. 23, 1888.
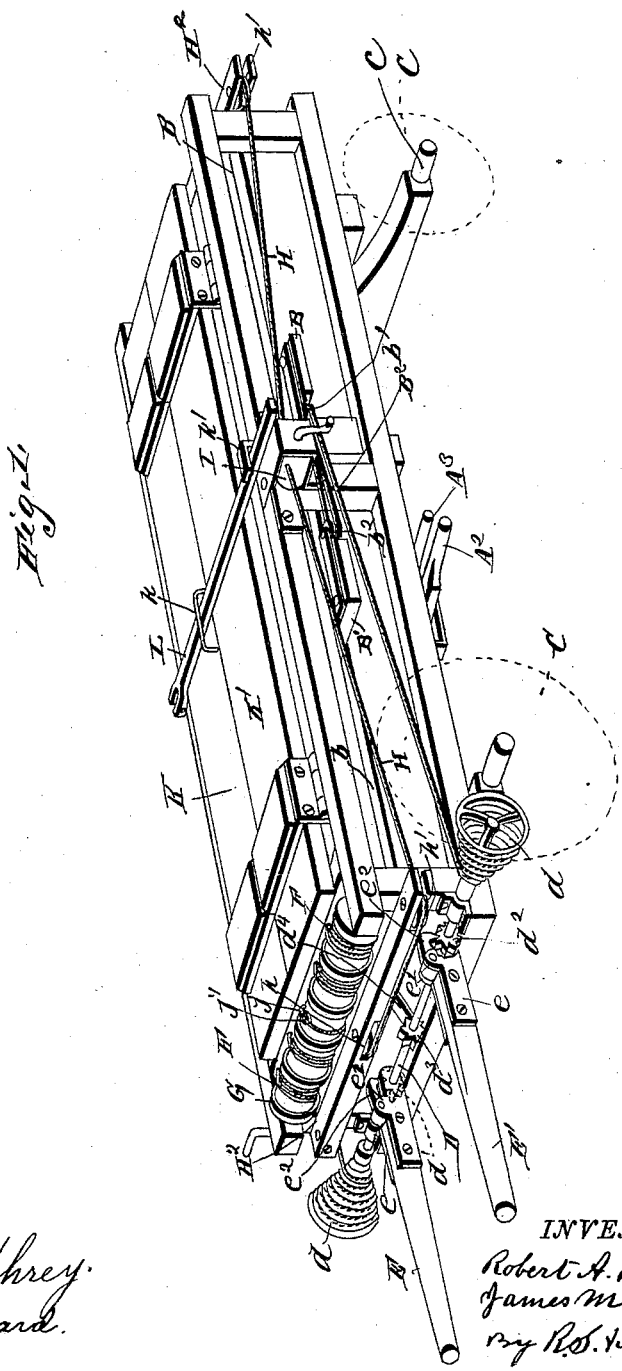
WITNESSES.
W. H. Pumphrey.
Van Buren Hillyard.
INVENTORS.
Robert A. Bowen.
James M. Eaton.
By R. S. & A. P. Lacey.
Attorneys.

(No Model.) 2 Sheets—Sheet 2.
R. A. BOWEN & J. M. EATON.
HAY PRESS.
No. 391,680. Patented Oct. 23, 1888.
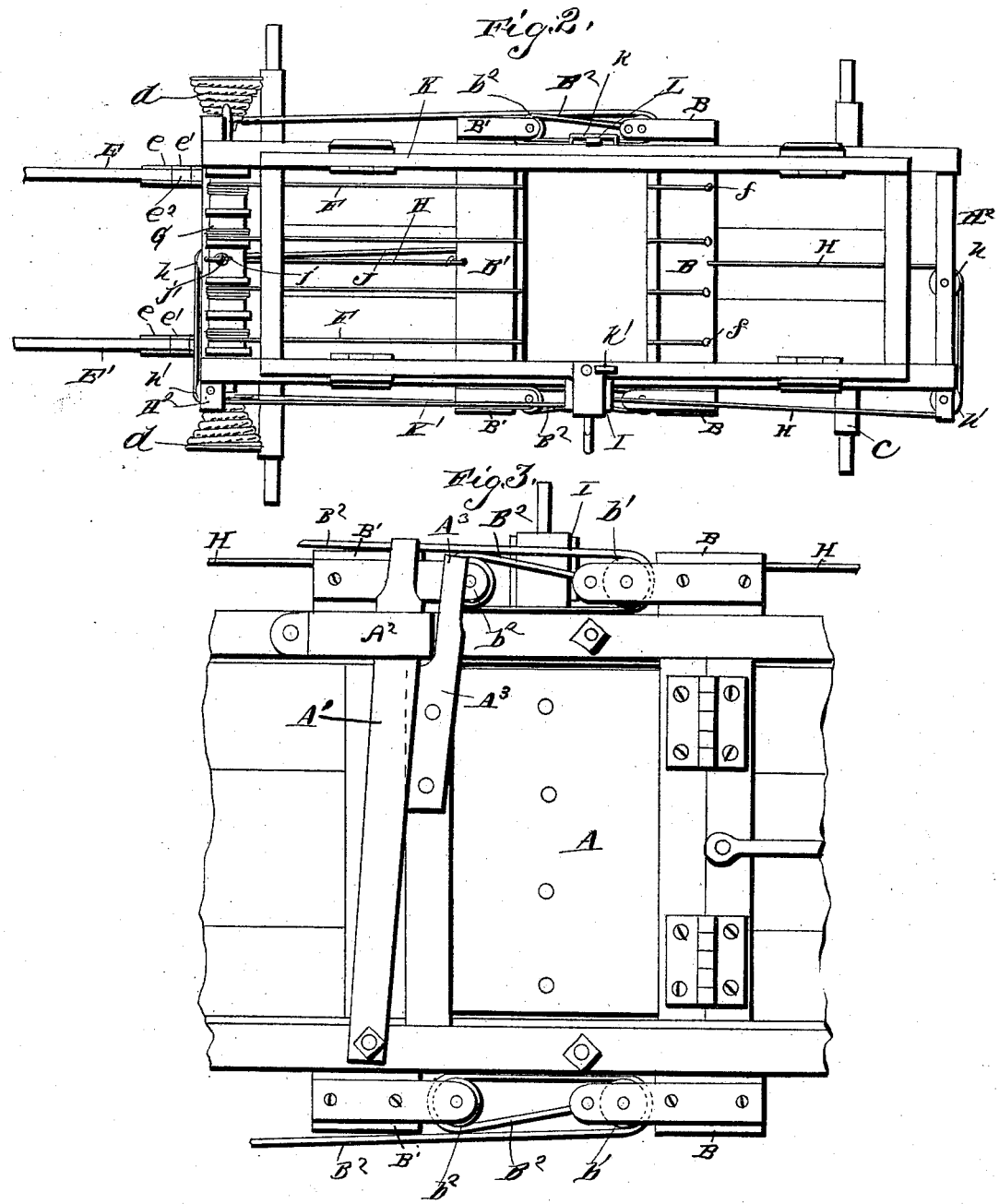
WITNESSES,
M. H. Pumphrey.
Van Buren Hillyard.
INVENTORS.
Robert A. Bowen.
James M. Eaton.
By R. S. & A. P. Lacey.
Attorneys.

United States Patent Office.

ROBERT A. BOWEN, OF ST. JAMES, AND JAMES M. EATON, OF CUBA, MISSOURI.

HAY-PRESS.

SPECIFICATION forming part of Letters Patent No. 391,680, dated October 23, 1888.

Application filed May 16, 1888. Serial No. 274,088. (No model.)

*To all whom it may concern:*

Be it known that we, ROBERT A. BOWEN and JAMES M. EATON, citizens of the United States, residing, respectively, at St. James, in the county of Phelps and State of Missouri, and Cuba, Crawford county, Missouri, have invented certain new and useful Improvements in Hay-Presses; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to portable hay-presses, and has for its object the production of a press which will be mounted on wheels the same as a vehicle-body, and which will be simple and compact in construction, efficient and durable in use, and which can be conveniently handled for baling the hay and ejecting the bale, which hereinafter will be more fully described and claimed, and shown in the accompanying drawings, in which—

Figure 1 is a perspective view of a hay-press embodying our invention; Fig. 2, a top plan view of the press; and Fig. 3, a bottom plan view, parts being broken away, of the bale-box on an enlarged scale.

The bale-box is constructed after the fashion of a vehicle-body, and is supported on the wheels C, (shown by dotted lines,) two front and two back. The front axle, $c$, is adapted to turn like the front axle of an ordinary wagon to facilitate the guiding of the device when moving it. The trap-door A in the bottom of the bale-box is hinged at one end and supported at its other end by the hand-bar A', that is pivoted at one end, and which is limited in its movement and supported at its other end by the keeper A². The trap-door is provided with the handle A³, by which it can be conveniently opened and shut. The hand-bar and the handle project on the same side of the bale-box to be grasped the more readily. The sides of the bale-box have grooves $b$, through which the ends of the beams of the followers B and B' project. The projecting ends of the beams are provided with pulleys $b'$ and $b^2$, respectively, and the ropes or cables B² are attached to the pulleys $b'$ and passed thence around the pulleys $b^2$, back around pulleys $b'$, and forward to the conical drums $d$, to which they are fastened and on which they are wound when operating the followers to compress the hay.

The drums $d$ are arranged on the ends of the shaft D, which is journaled at one end of the bale-box, and are each provided with a spiral groove, into which the rope or cable is wound, and are formed, preferably, of cast metal and hollow. On this shaft D are mounted three ratchet-wheels, $d'$, $d^2$, and $d^3$. The ratchet-wheels $d'$ and $d^2$ are acted on by the operating-levers E and E', and the ratchet-wheel $d^3$ is provided with the pawl $d^4$, to prevent the shaft D from turning back when the levers E and E' are moved back to obtain a fresh grip on the ratchet-wheels $d'$ and $d^2$. Each of the operating-levers has metal plates $e$ at its inner end, which embrace the ratchet-wheel and are mounted on the shaft D. The pawls $e^2$ are pivoted between the ears $e'$ of the plates $e$.

The binding cords or wires F are wound on the shaft G, and are adapted to pass through slots in the edges of the followers and have their ends attached to pins $f$ in the follower B.

The followers are drawn back to the ends of the bale-box by the cord or cable H, which is attached at its ends to the followers and passes over pulleys $h$ and $h'$ in the cross-bars H² at the ends of the bale-box, and thence through the windlass or drum I at the side of the bale-box. The follower B' can be drawn back independently of the follower B by the cord J, which is attached to the follower B', and is provided with the hook $j$, that is adapted to be engaged with the eye $j'$ on the shaft G. When the hook $j$ is engaged with the eye $j'$ and the shaft G rotated, the cord J will be wound on the said shaft and draw the follower back.

The bale-box is closed by the two doors K and K', which are fastened by the bar L, that is pivoted at one end and passes through the keeper $k$ on the door K, and is adapted to be fastened at its other end to the hook $k'$.

In practice the followers are drawn back to the ends of the bale-box, the doors K and K' opened, the hay placed in the bale-box, and the doors shut and fastened. The shaft D is now rotated and winds up the cables B² and draws the followers together. When the hay is sufficiently compressed, the doors are opened and the binding-cords cut and fastened around the bale. The windlass I is now operated to draw the followers back to receive the new charge of hay, and the bale just formed is removed through the trap-door A.

Having thus described our invention, what we claim, and desire to secure by Letters Patent, is—

The herein shown and described portable press, consisting of the bale-box mounted on wheels and having a door in its bottom, slots in its sides, and doors closing its top, the two opposing followers having portions thereof projecting through the slots in the sides of the bale-box and provided with pulleys, the shaft D, having cone-shaped drums at its ends, the levers for rotating the said shaft, the cables passing around the pulleys on the projecting ends of the followers and secured to the cone-drums, the shaft G, having the binding-cords wound thereon, the cord J, secured at its inner end to one of the followers and adapted to have its other end secured to the shaft G, the windlass I, and the rope H, connected with the windlass I and having its ends passed over guide-pulleys and connected with the followers, all combined and arranged substantially as and for the purpose described.

In testimony whereof we affix our signatures in presence of two witnesses.

ROBERT A. BOWEN.
JAMES M. EATON.

Witnesses:
JOHN M. MUNRO,
J. L. BLAIR.